United States Patent
Ignjatovic et al.

(10) Patent No.: US 9,970,717 B2
(45) Date of Patent: May 15, 2018

(54) HEAT EXCHANGER

(71) Applicant: BEHR GMBH & CO. KG, Stuttgart (DE)

(72) Inventors: Spasoje Ignjatovic, Illingen (DE); Juri Kandlen, Balingen (DE); Jens Richter, Großbottwar (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 399 days.

(21) Appl. No.: 14/413,072

(22) PCT Filed: Jul. 5, 2013

(86) PCT No.: PCT/EP2013/064318
§ 371 (c)(1),
(2) Date: Jan. 6, 2015

(87) PCT Pub. No.: WO2014/006213
PCT Pub. Date: Jan. 9, 2014

(65) Prior Publication Data
US 2015/0184952 A1    Jul. 2, 2015

(30) Foreign Application Priority Data
Jul. 6, 2012    (DE) .................. 10 2012 211 857

(51) Int. Cl.
*F28F 9/02*    (2006.01)
*F28D 7/16*    (2006.01)
(Continued)

(52) U.S. Cl.
CPC ............ *F28F 9/02* (2013.01); *F02B 29/0425* (2013.01); *F02B 29/0456* (2013.01); *F28D 7/16* (2013.01);
(Continued)

(58) Field of Classification Search
CPC ........ F28D 7/16; F28D 9/0062; F28D 9/0093; F02B 29/0425; F02B 29/0456; F02B 29/0475; F28F 9/001; Y02T 10/146
(Continued)

(56) References Cited

U.S. PATENT DOCUMENTS

2008/0121384 A1    5/2008  Tseng
2008/0169093 A1*   7/2008  Ohfune ................. F28D 7/1684
                                                    165/164

(Continued)

FOREIGN PATENT DOCUMENTS

DE    203 17 182 U1    2/2004
DE    103 59 806 A1    7/2005
(Continued)

OTHER PUBLICATIONS

International Search Report, PCT/EP2013/064318, dated Oct. 28, 2013, 3 pgs.
(Continued)

*Primary Examiner* — Jianying Atkisson
*Assistant Examiner* — Joel Attey
(74) *Attorney, Agent, or Firm* — Paul D. Strain, Esq.; Strain & Strain PLLC

(57) ABSTRACT

A heat exchanger, especially a charge-air cooler or exhaust-gas cooler, with a tube-to-tubesheet sub-assembly, in which tubes are inserted in a sealed manner by their ends into openings of two oppositely-disposed tubesheets, wherein at least one region of a housing is arranged between the two tubesheets and encompasses and outwardly seals the tubes of the sub-assembly, wherein the two tubesheets have two sides extending parallel to each other and adjoining an end region of the tubes in each case, and on which is arranged in each case a housing section which is connected to the housing, wherein on at least one of the tubesheets a seal is (Continued)

arranged with sealing effect between the housing and this tubesheet and/or between this tubesheet and the housing section which is arranged on this tubesheet.

10 Claims, 13 Drawing Sheets

(51) Int. Cl.
    *F28F 9/00*     (2006.01)
    *F28D 9/00*     (2006.01)
    *F02B 29/04*     (2006.01)
    *F28F 21/06*     (2006.01)
    *F28F 21/08*     (2006.01)

(52) U.S. Cl.
    CPC ............ *F28F 9/001* (2013.01); *F28F 9/0226* (2013.01); *F02B 29/0475* (2013.01); *F28D 9/0062* (2013.01); *F28D 9/0093* (2013.01); *F28F 21/06* (2013.01); *F28F 21/08* (2013.01); *Y02T 10/146* (2013.01)

(58) Field of Classification Search
    USPC ........................................................ 165/158
    See application file for complete search history.

(56) References Cited

U.S. PATENT DOCUMENTS

| 2010/0089548 | A1* | 4/2010 | Braic | F28D 7/1692 |
| --- | --- | --- | --- | --- |
| | | | | 165/51 |
| 2011/0168370 | A1* | 7/2011 | Garret | F28D 7/1684 |
| | | | | 165/158 |

FOREIGN PATENT DOCUMENTS

| DE | 10 2007 049 665 A1 | 5/2008 |
| --- | --- | --- |
| DE | 10 2008 018 594 A1 | 10/2008 |
| EP | 1 707 911 A1 | 10/2006 |
| EP | 2 458 312 A1 | 5/2012 |
| JP | S62-52793 U | 4/1987 |
| JP | S62-156283 U | 10/1987 |
| JP | 2001-88538 A | 4/2001 |
| JP | 2010-127143 A | 6/2010 |
| JP | 2010-243125 A | 10/2010 |
| JP | 2011-525609 A | 9/2011 |
| WO | WO 2009/121531 A1 | 10/2009 |
| WO | WO 2011/061311 A1 | 5/2011 |

OTHER PUBLICATIONS

German Search Report, 10 2012 211 857.8, dated Apr. 4, 2013, 5 pgs.

* cited by examiner

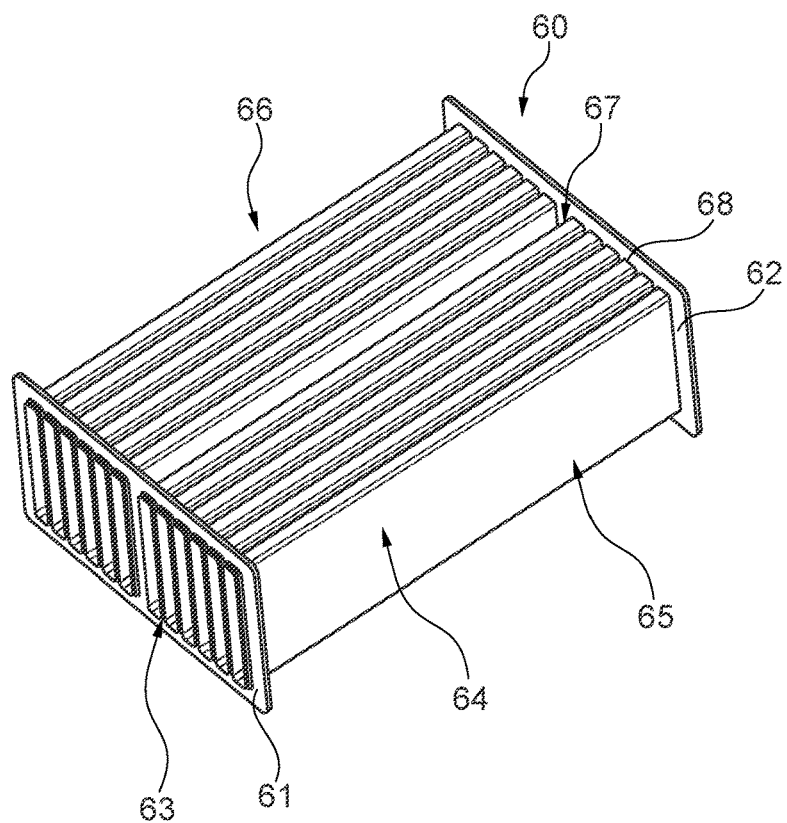
Fig. 4
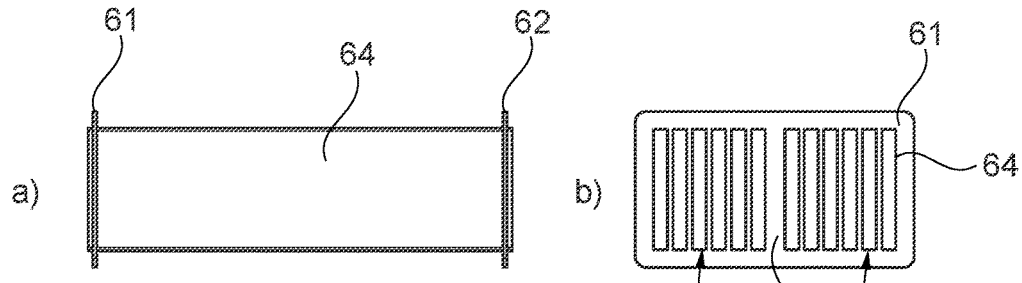
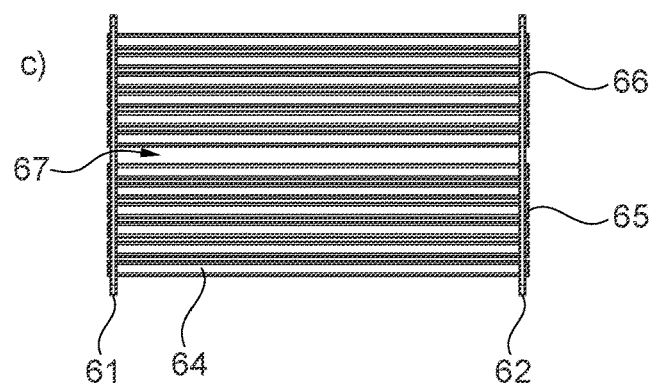
Fig. 5

HEAT EXCHANGER

CROSS-REFERENCE TO RELATED PATENT APPLICATIONS

This application is a National Stage of International Application No. PCT/EP2013/064318, filed Jul. 5, 2013, which is based upon and claims the benefit of priority from prior German Patent Application No. 10 2012 211 857.8, filed Jul. 6, 2012, the entire contents of all of which are incorporated herein by reference in their entirety.

TECHNICAL FIELD

The invention relates to a heat exchanger, especially a charge-air cooler for cooling charge air or an exhaust-gas cooler for cooling exhaust gases of internal combustion engines, especially for motor vehicles.

BACKGROUND OF THE INVENTION

In motor vehicles, charging of the combustion air in internal combustion engines has been used for a long time. As a result of the charging, for example by means of turbochargers or compressors, the charge air is intensely heated as a result of compression, however, so that this is disadvantageous for feeding into the internal combustion engine and for combustion there. Charge-air coolers, which are installed in the front of the vehicle as air-to-air heat exchangers, are known for the cooling of the charge air. To this end, a hose arrangement from the charger to the heat exchanger and from the heat exchanger to the internal combustion engine is required.

In addition, coolant-cooled charge-air coolers are also known and as air-to-coolant heat exchangers are fed with the normal coolant of the internal combustion engine or with a separate low-temperature coolant at a reduced temperature compared with the engine coolant. Alternatively, cooling can also be carried out with a refrigerant. These types of charge-air coolers are not specifically to be installed at the front of the vehicle but can also be installed close to the engine in the engine compartment, for example.

As a result of the air-to-coolant cooling method, the heat exchanger can also be of a compact construction, which increases its applicability and facilitates its positioning.

Such a compact type of construction is known from EP 1 707 311 A1, for example. This type of construction, however, has the advantage that both the tube-to-tubesheet sub-assembly and the housing encompassing this is produced from metal and soldered and even welded, whereas the inflow-side and outflow-side collector boxes are produced from plastic and are connected by means of a flange, with an interposed seal, to the tubesheet consisting of metal.

This brings along with it the disadvantage that a large number of different joining operations are necessary on a heat exchanger, which can be carried out on respectively different devices, therefore needing high investments and consequently the production is relatively time-consuming and expensive.

SUMMARY OF THE INVENTION, OBJECT, SOLUTION, ADVANTAGES

It is the object of the invention to create a heat exchanger of the type referred to in the introduction which can be produced in a simple and cost-effective manner.

This is achieved by the features of claim 1.

An exemplary embodiment of the invention provides a heat exchanger, such as especially a charge-air cooler or exhaust-gas cooler, with a tube-to-tubesheet sub-assembly, in which tubes are inserted in a sealed manner by their opposite ends into openings of two oppositely-disposed tubesheets, wherein at least one region of a housing, which encompasses and outwardly seals the tubes of the sub-assembly, is arranged between the two tubesheets, wherein the two tubesheets have two sides extending parallel to each other and adjoining an end region of the tubes in each case, and on which a further housing section is arranged in each case on a side of a tubesheet opposite the housing between the tubesheets and which is connected in a sealed manner to the housing between the tubesheets, wherein on at least one of the tubesheets and a seal is arranged with sealing effect between the housing and the this tubesheet and/or between this tubesheet and the additional housing section which is arranged on this tubesheet, and the tubesheet. The effect which can consequently be achieved is that a simply solderable tube-to-tubesheet sub-assembly can be produced and can be equipped with inexpensive housing sections in a simple manner. As a result of the simple design of a tube-to-tubesheet sub-assembly, during the soldering the transit time through a soldering furnace can be reduced because no additional large masses, which increase the heating duration of the parts in the soldering furnace, have to be soldered together.

It is also advantageous if on both sides of the sub-assembly a housing section is arranged in each case on the two sides of the two tubesheets lying opposite the sub-assembly and is connected in a sealed manner to the housing between the tubesheets, and if a seal is arranged with sealing effect between the housing and the tubesheet and/or between the housing section and the tubesheet. The effect which is consequently achieved is that a housing encloses the tube-to-tubesheet sub-assembly in such a way that the sub-assembly is accommodated and enclosed in a sealed manner. The effect which can consequently be achieved is that a simply solderable tube-to-tubesheet sub-assembly can be produced and can be equipped with inexpensive housing sections in a simple manner. As a result of the simple design of a tube-to-tubesheet sub-assembly, during the soldering the transit time through a soldering furnace can be reduced because no additional large masses, which increase the heating duration of the parts in the soldering furnace, have to be soldered together.

It is also advantageous if the housing between the two tubesheets consists of at least two elements which are interconnected in a fluidtight manner. This simplifies the construction, wherein it is particularly advantageous if the two parts are of identical design.

Also, it is expedient if the housing consists of two shells which in each case at least partially enclose the sub-assembly and are interconnected in a fluidtight manner. In this case, it can be expedient if the two shells are approximately of a U-shaped design consisting of a cover plate and two side plates which are sifted to each other so that the side plates butt against each other and are interconnected in a sealed manner. Similar configurations can be realized in this way, wherein it is expedient if the inlet connector and the outlet connector for the coolant are arranged together on one shell or split between both shells so that a connector is provided on one shell in each case.

It is advantageous if the elements of the housing consist of metal or plastic and are interconnected especially by means of welding, or adhesive bonding, or soldering. In this case, the design consisting of plastic, such as polyamide inter alia, is especially preferred.

It is also expedient if the at least one housing section or the housing sections consist of metal or plastic and are connected to the housing by means of welding, or adhesive bonding, or soldering. To this end, the design consisting of plastic is also especially advantageous.

It is also advantageous it the housing, on at least one lateral end in relation to the tubesheet, has a flange which projects laterally beyond the tubesheet, wherein the at least one housing section, on its one lateral end, also has a flange which projects laterally beyond the tubesheet, wherein the housing and the housing section in the region of the projecting flanges are interconnected in a sealed manner in such a way that the tubesheet is accommodated by the housing and the housing section.

It is also expedient if a seal is arranged between the flange of the housing and the tubesheet for sealing the interior of the housing in relation to the interior of the housing section. As a result, a reliable seal can be provided, which is preferred.

It is also expedient if a seal is arranged between the flange of additional housing section and the tubesheet for sealing the interior of the housing in relation to the interior of the additional housing section.

Furthermore, it is advantageous if two seals are arranged on both sides of the tubesheet.

It is also advantageous if there is an opening between the tubes of the sub-assembly for the penetration of at least one connecting element which interconnects, or interconnect, at least two housing elements.

Further advantageous embodiments are described by the following figure description and by the dependent claims.

BRIEF DESCRIPTION OF THE DRAWINGS

The invention is explained in more detail below on the basis of at least one exemplary embodiment with reference to the drawings. In the drawing:

FIG. 4 shows a perspective view of a tube-to-tubesheet sub-assembly, FIG. 5 shows partial views of the tube-to-tubesheet sub-assembly in side view from the front, from the side and from above.

PREFERRED EMBODIMENT OF THE INVENTION

Figure 1:
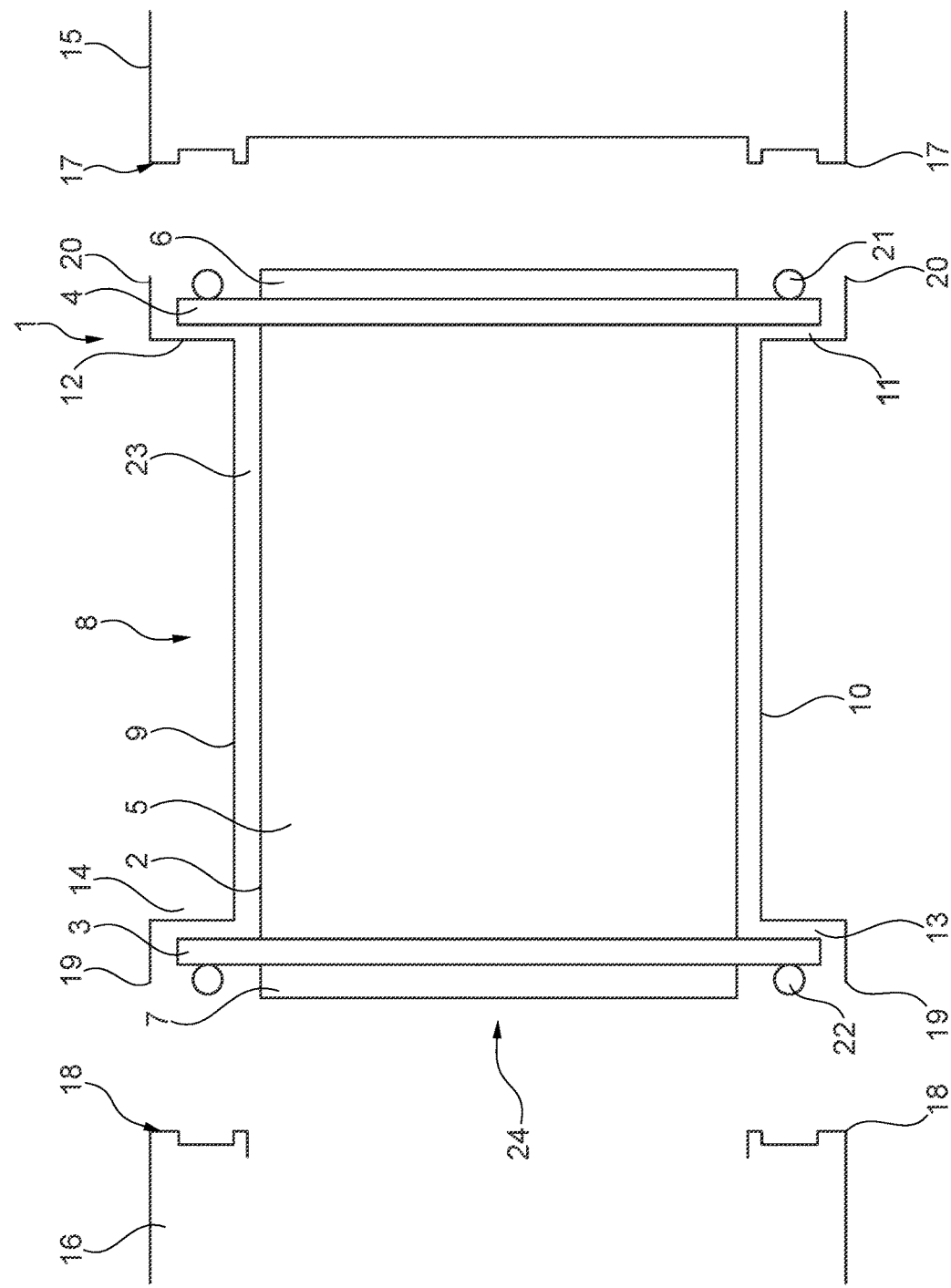
FIG. 1 shows a schematic view of a heat exchanger with a tube-to-tubesheet sub-assembly and a housing.

FIG. 1 schematically shows a part of a heat exchanger 1 with a tube-to-tubesheet sub-assembly 2. The tube-to-tubesheet sub-assembly 2 is formed by a first tubesheet 3, a second tubesheet 4 and by a number of tubes 5 which are inserted by their end sides into openings in the tubesheets and interconnected there in a fluidtight manner. The tubes 5 can preferably be inserted by their end regions 6, 7 into the openings of the tubesheets 3, 4 and soldered to these. Other connecting possibilities are welding or adhesive bonding, for example.

As is to be seen, provision is made between the tubesheets 3, 4 for a housing 8 which is preferably assembled from two shells 9, 10 as housing elements. To this end, the housing has a flange 11, 12, 13 and 14 on its two end regions which fits over the tubesheet on the outside.

The tubesheets 3, 4 have two flat sides which extend parallel to each other and in each case adjoin an end region 6, 7 of the tubes 5, and in which the openings for penetration of the tubes are preferably introduced. On the opposite sides of the tubesheets, that is to say on the sides adjoining an end region 6, 7 of the tubes 5, relative to the sides of the tubesheet 3, 4 which are adjacent to the housing 8, provision is made for additional housing sections 15, 16 which are connected to the housing 8 or to the elements 9 or 10 of the housing 8 which is arranged between the two tubesheets 3, 4. To this end, the housing sections 15, 16 have a connecting region 17, 18 which by the connecting region 19, 20 of the housing 8 can be connected to the housing elements 9, 10. Between the housing and the respective tubesheet 3, 4 provision is furthermore made in each case for a seal 21, 22 which is arranged in a continuously circumferential manner around the tubesheet. As a result of the connection of the housing elements or housing sections 16, 9, 10 or 15, 9, 10, the seal 21 or 22 is pressed against the housing 15, 16 and the tubesheet 3, 4 so that a media separation between the throughflow region 23 for a coolant and throughflow region 24 for a medium flowing through the tube is provided.

Figure 2:
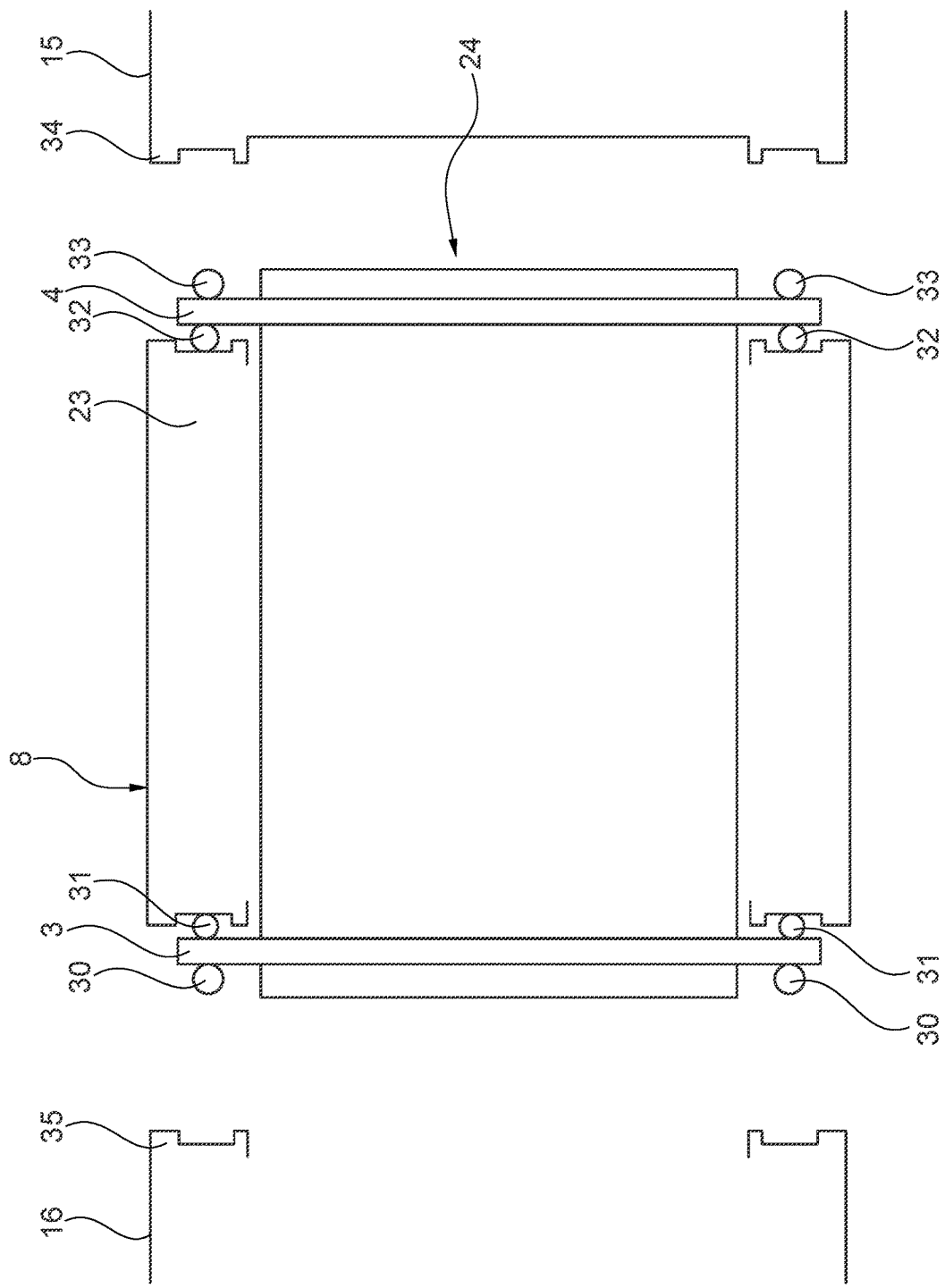
FIG. 2 shows a schematic view of a heat exchanger with a tube-to-tubesheet sub-assembly and a housing.

FIG. 2 shows in a further exemplary embodiment an alternative to the view of FIG. 1, wherein in the exemplary embodiment of FIG. 2 seals 30, 31, 32, 33 are provided on both sides of the tubesheets 3, 4, wherein the seal 30 has a sealing effect between the tubesheet 3 and the housing 16, the seal 31 has a sealing effect between the tubesheet 3 and the housing 8, the seal 32 has a sealing effect between the housing 8 and the tubesheet 4 and the seal 32 has a sealing effect between the tubesheet 4 and the housing 15. The two housing sections 15, 16 are connected to the housing 8 so that the seals are pressed against the tubesheets, and the media separation is a correspondingly realized.

In this case, the flange 34, 35 encompasses the tubesheet 3, 4 on the outside so that a connection between the housing sections 15, 16 to the housing 8 can be realized so that the seals are pressed in each case against the tubesheet in order to achieve the media separation between the regions 23 of the coolant throughflow and regions 24 of the media throughflow through the tubes.

Figure 3:
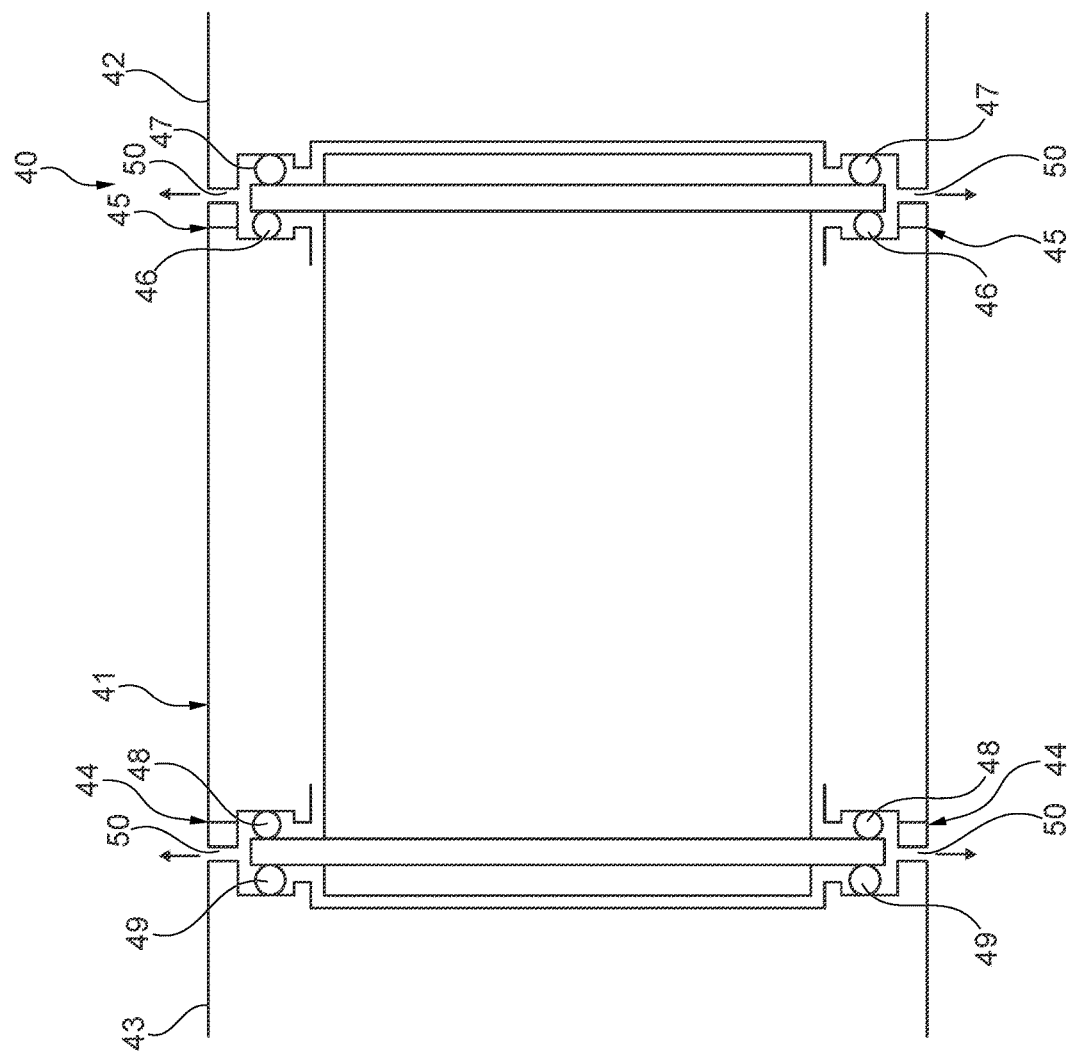
FIG. 3 shows a schematic view of a heat exchanger with a tube-to-tubesheet sub-assembly and a housing.

FIG. 3 shows a further alternative design of a heat exchanger 40, in which the housing 41 is connected to the housing sections 42, 43 in the region of the connection 44, 45, wherein in the region of the arrangement of the seals 46, 47, 48, 49 provision is furthermore made in the housing for a hole 50 which can serve as a drainage opening in order that a medium, which could flow past the seal 46 to 49, does not find its way into the other media flow but can escape from the housing of the heat exchanger.

FIG. 4 shows a perspective view of a tube-to-tubesheet sub-assembly 60 which has two spaced apart tubesheets 61, 62 which are provided with openings 63. Tubes 64 are arranged next to each other in a row between the two tubesheets 61, 62, wherein the tubes 64 on the end side are accommodated in each case in a sealed manner in the openings 63 of the tubesheets 61, 62. To this end, the tubesheets 61, 62 can also have passages around the openings which can serve for the soldering of the tube ends.

As is to be seen in FIG. 4, the tubes 64 are arranged in two groups 65, 66, wherein a distance is maintained between the two tube groups so that a space region 67 is formed and is larger than the normal distance 68 between the tubes of a group. Not apparent in FIG. 4 is that turbulence inserts can also be provided between the tubes. These are preferably arranged between two adjacent tubes of a group, wherein the space region 67 is free of turbulence inserts.

FIG. 5, by the sub-figures a, b and c, shows the tube-to-tubesheet sub-assembly 60 in a side view, in a view from the front, in a view toward the openings of the tubesheets and in a view from the top.

In sub-FIG. 5a, a tube 64 is to be seen between two tubesheets 61, 62, wherein the ends of the tubes project slightly beyond the tubesheets 61, 62.

Sub-FIG. 5b shows a tubesheet 61 with tubes 64 in a front view, wherein the group of tubes 65 and the group of tubes 66, with the gap 67 between these two groups, are to be clearly seen.

Sub-FIG. 5c shows the tube-to-tubesheet sub-assembly in a view from the top. Apparent are the two tubesheets 61, 62 and the tubes 64 which are arranged in two groups 65, 66 with a gap 67 between the two groups.

Figure 6:
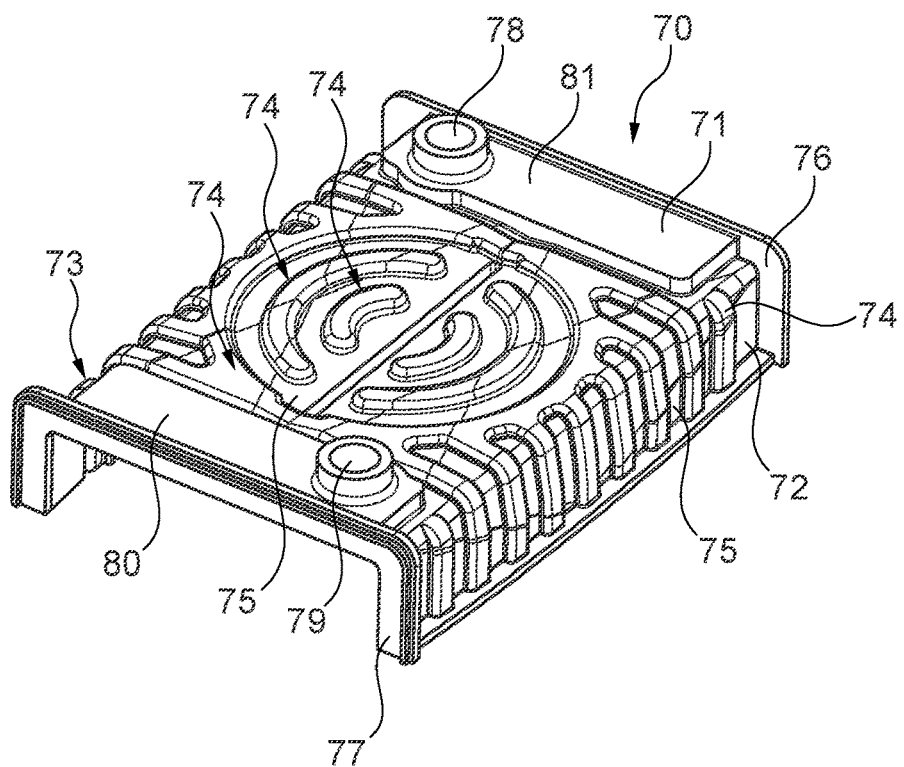
FIG. 6 shows a view of a housing section from above.
Figure 7:
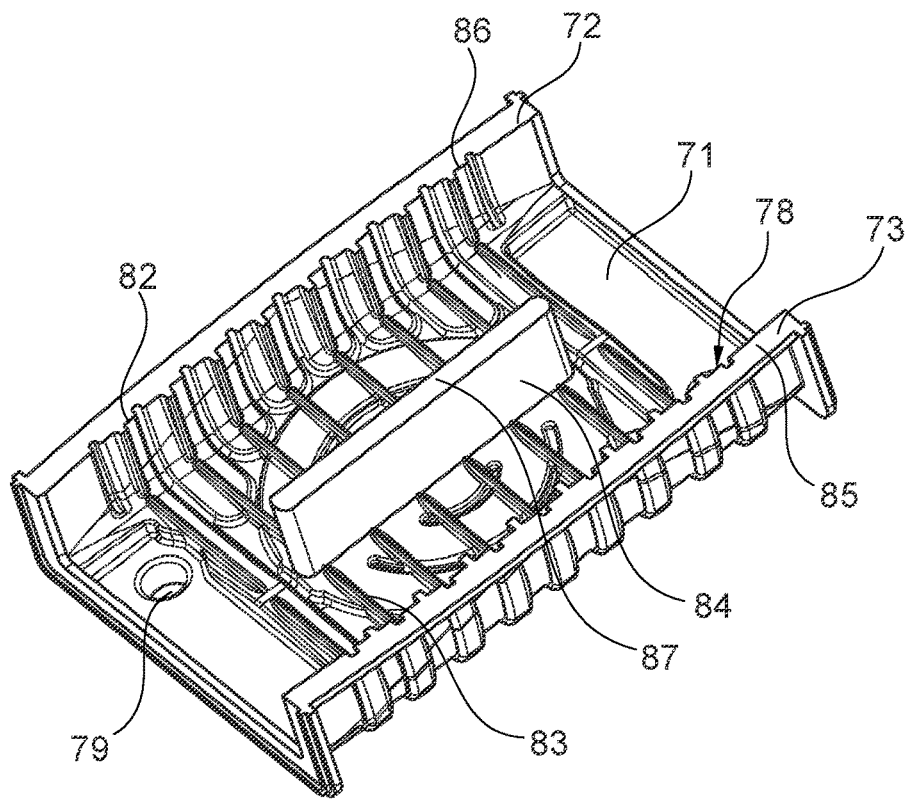
FIG. 7 shows a view of the housing section of FIG. 6 from the bottom side.

FIG. 6 shows a three-dimensional view of a housing element 70, as is arranged between the two tubesheets, in order to close off the tubes towards the outside. FIG. 6 shows this housing element 70 in a view from the top, and FIG. 7 shows the housing element in a view from the inside.

The housing element 70 is formed with a U-shape design and has an upper wall 71 and two side walls 72, 73. The two side walls 72, 73 are formed essentially at right angles to the wall 71. As is to be seen, a structure with ribs 74 and grooves 75 is incorporated in the walls 72, 73, which serves for the stiffening of the housing element 70. In this case, provision is made centrally in the region of the surface 71 for annular grooves 75 which are separated from each other by means of annular projections 74.

In the edge region, the projections 74 and grooves are straight and adopt the transition of the surface 71 to the side walls 72, 73 in the manner of an elbow and extend essentially along the entire side walls 72, 73.

To be seen on the end regions of the housing element is the respective flange by means of which the component can butt against additional housing sections and fit over the tube-sheet. Also, a part of the flange 76, 77 can be used for accommodating a seal between it and the tubesheet wall in order to ensure a seal between these components as a result. A part of the flange preferably fits over the tubesheet on the outside and is connected to an additional housing section.

Also to be seen is that connectors 78, 79 are in communication with distribution chambers 80, 81. The fluid for cooling a medium which flows through the tubes of the tube-to-tubesheet sub-assembly can be admitted by means of the connector 78 for example into the heat exchanger housing, flows around the tubes of the tube-to-tubesheet sub-assembly and can escape again from the heat exchanger at the connector 79.

The distribution passages 80, 82 serve for better distribution of the coolant across the width of the heat exchanger before it flows around the tube-to-tubesheet sub-assembly. FIG. 7 shows the housing element 70 from below, wherein provision is also made on the inner side for ribs 82, 83 for deflecting the fluid or as a fluid barrier so that the fluid does not take the shortest way between the connectors 79, 78 but flows around the tubes of the tube-to-tubesheet sub-assembly. To this end, the ribs 82, 83 are preferably oriented in a plane which is perpendicular to the longitudinal direction of the tubes.

The housing element furthermore has a projection 84 which is embodied in the longitudinal direction of the tubes perpendicularly to the plane of the surface 71 of the housing element. The projection 84 is approximately of cuboid form and has a height which corresponds approximately to the height of the side wall 72. If two such housing elements are placed one on top of the other by the faces 85, 86 then the two housing elements 70 enclose the tube-to-tubesheet sub-assembly and the faces 85 and 86 are in contact, wherein the end faces 87 of the projection 84 are also in contact with each other. For connecting two such housing elements 70, a welded joint can preferably be produced between the faces 86, 85 and 87. However, other connecting processes, such as adhesive bonding, for example, can also be used.

Figure 8:
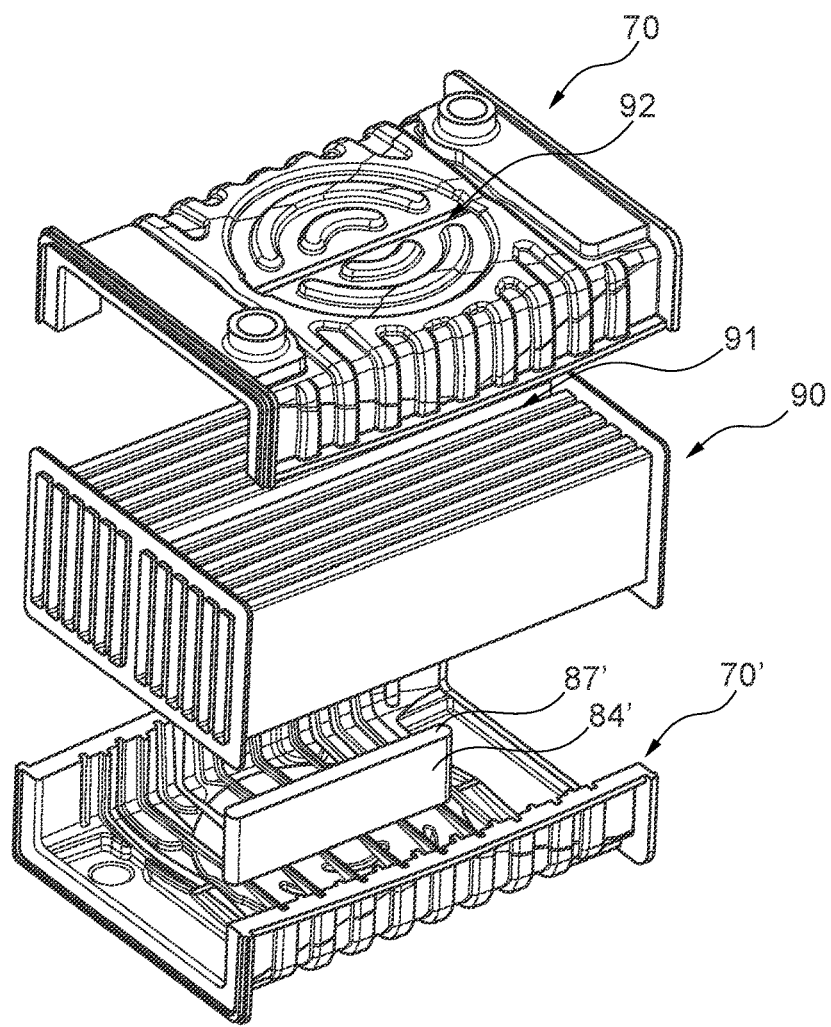
FIG. 8 shows a view of two housing sections and a tube-to-tubesheet sub-assembly before assembly.

FIG. 8 shows how two housing elements 70 are used in order to enclose a tube-to-tubesheet sub-assembly 90. In this case, one housing element 70 is fitted from the top and one housing element 70' fitted from the bottom onto the tube-to-tubesheet sub-assembly 90 in such a way that the projections 84 and 84' engage in the spaced free gap 91.

Seen in section, the projection 84 or 84' is of a double-walled design and has a central groove 92 which serves for interconnecting the two end faces 87 or 87'.

Figure 9:
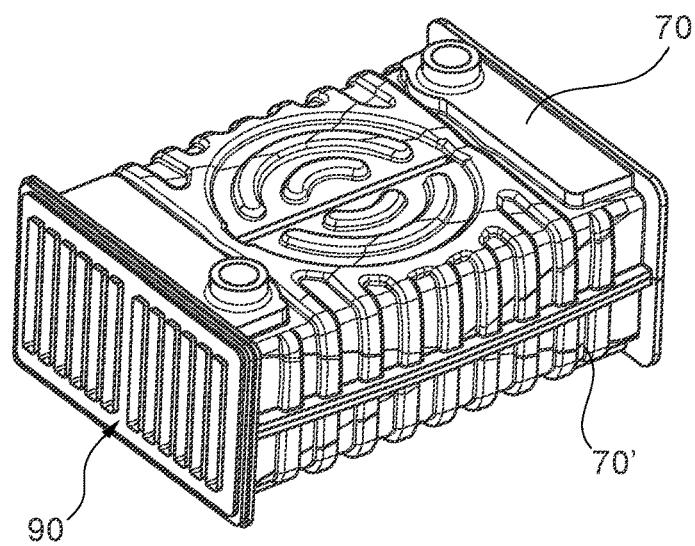
FIG. 9 shows a view of two housing sections and a tube-to-tubesheet sub-assembly after assembly.

FIG. 9 shows the tube-to-tubesheet sub-assembly with the housing elements 70 and 70' which enclose the tubes. In this case, the tubes are interconnected in the region of the faces 85, 86 and 87 according to FIGS. 6 to 8, such as being advantageously welded together or adhesively bonded together.

Figure 10:
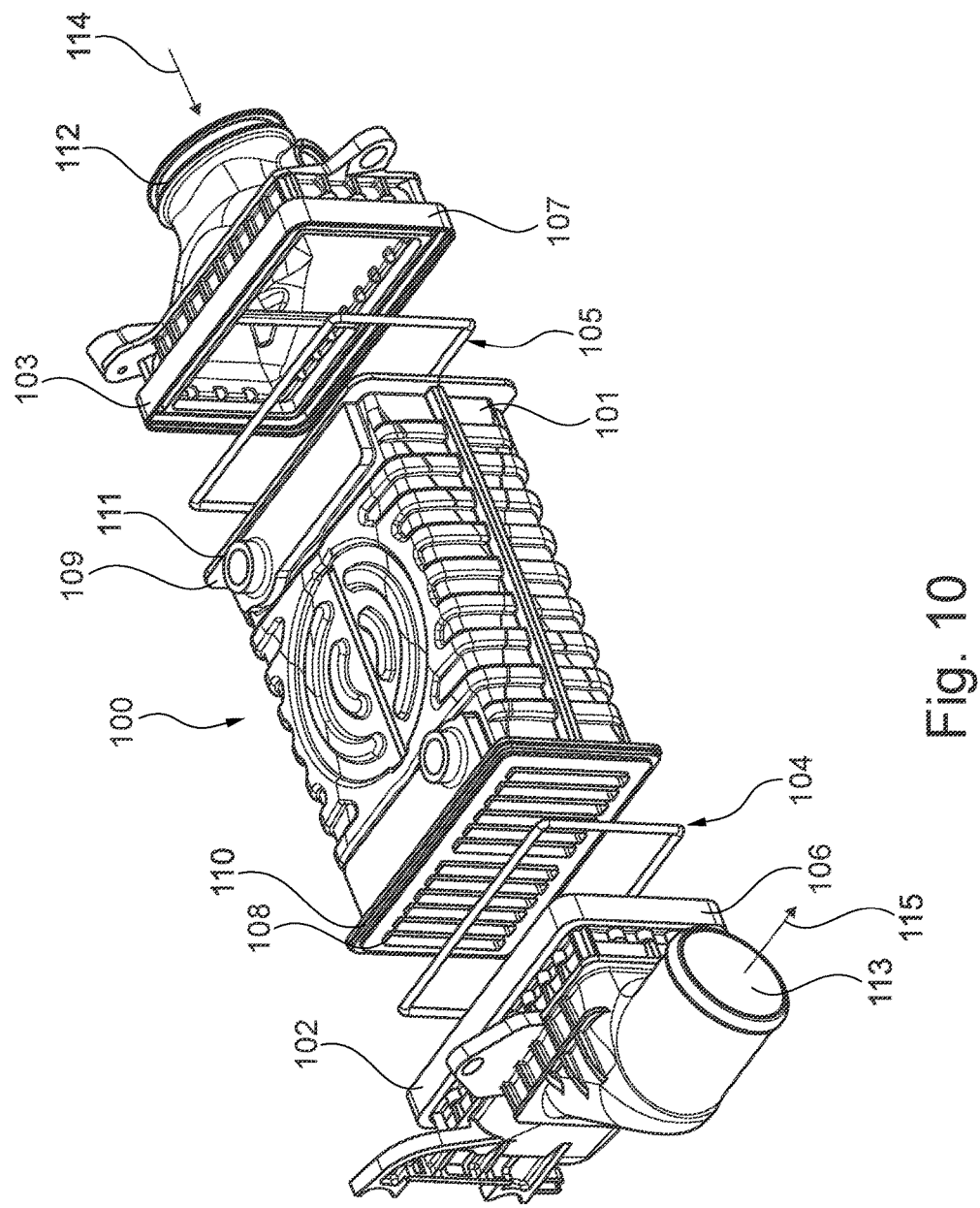
FIG. 10 shows a view of a tube-to-tubesheet sub-assembly with housing and with additional housing sections.

FIG. 10 shows a view of a tube-to-tubesheet sub-assembly with a housing 100, wherein on the side facing away from the housing 101 additional housing sections 102, 103 and the shim 104, 105 are mounted on the tubesheets. In this way, a rectangular seal is arranged between the flange 106, 107 and the tubesheet 108, 109 or the flange 110, 111 of the housing 101 which projects beyond the tubesheet. The housing section 102 is then connected by a flange 106 to the flange 110 of the housing 101 and the housing section 103 is connected by the flange 107 to the flange 111 of the housing 101. In the process, the seal 104, 105 is compressed and the region of the heat exchanger through which coolant flows is consequently sealed against, and separated from, the region through which flows the medium which flows through the tubes.

Also to be seen is that the housing sections 102, 103 are formed with connectors 112, 113 so that for example a medium flows into the connector 112 according to the arrow 114 and can flow out of the connector 113 again according to the arrow 115.

Figure 11:
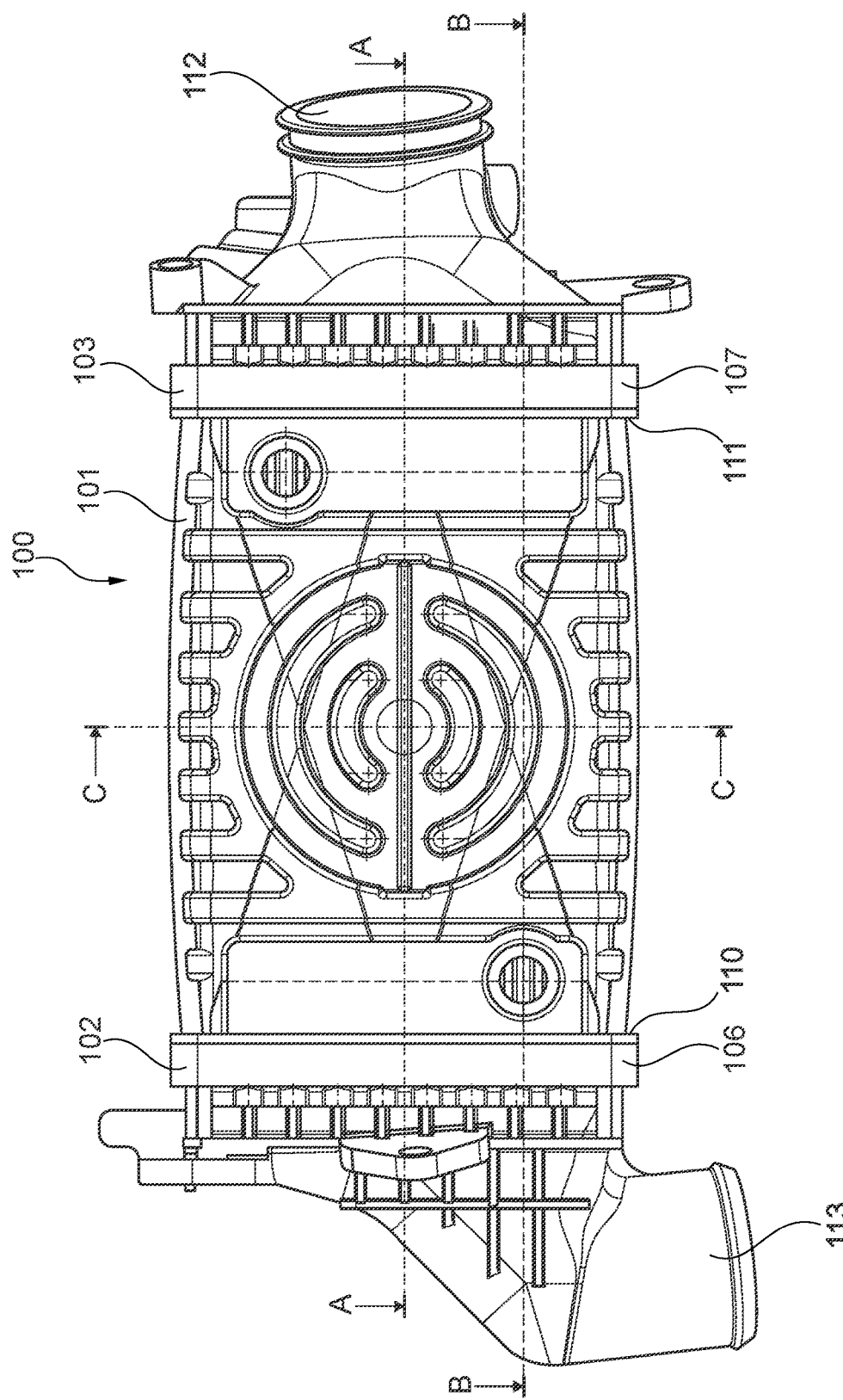
FIG. 11 shows a view of the heat exchanger.

FIG. 11 shows the assembled heat exchanger unit 100 with the housing 101 and the housing sections 102, 103 which are connected in a sealed manner by means of their flanges 106, 107 to the flange 110, 111 of the housing 102.

Figure 12:
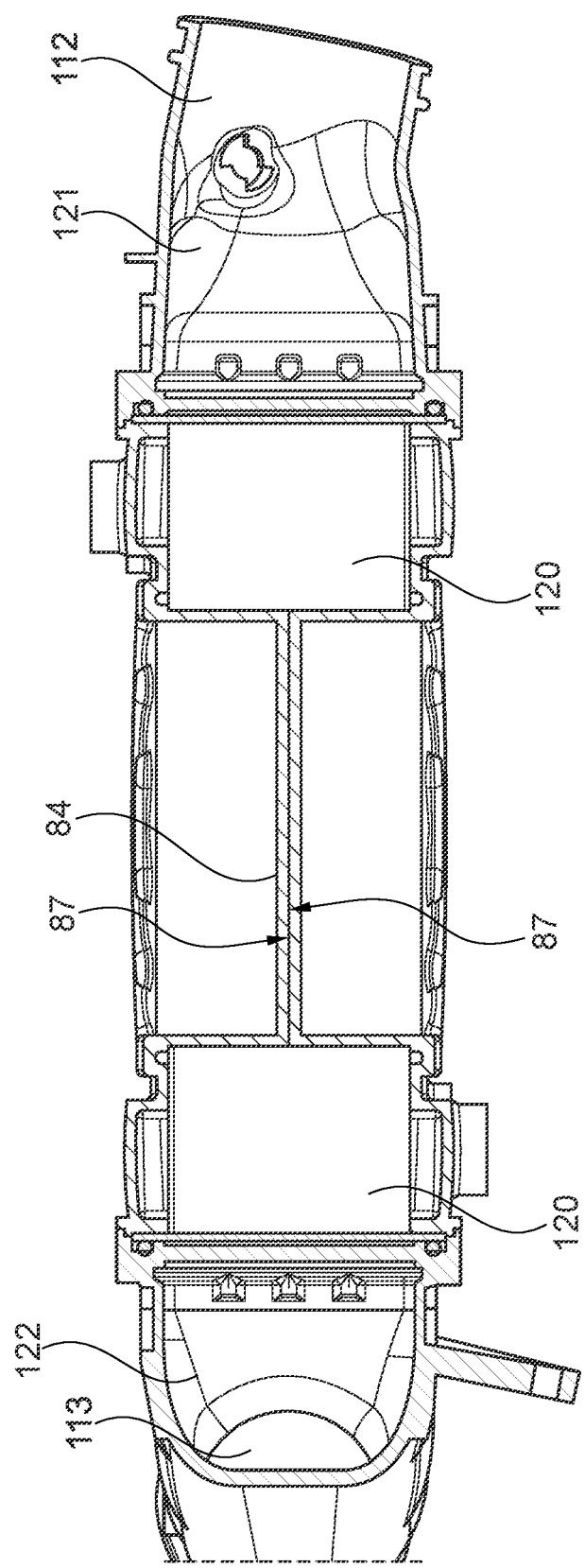
FIG. 12 shows a section through the heat exchanger of FIG. 11 according to line A-A.

FIG. 12 shows a section of FIG. 11 along the line A-A. The ribs, which in FIG. 7 are provided with the designation 84, are seen as center sections, wherein the ribs 84 are interconnected by their end faces 87. Also to be seen are tubes 120 and the inlet-side and outlet-side diffusers 121, 122 which open into the inlet connector 112 and outlet 113 connector respectively.

Figure 13:
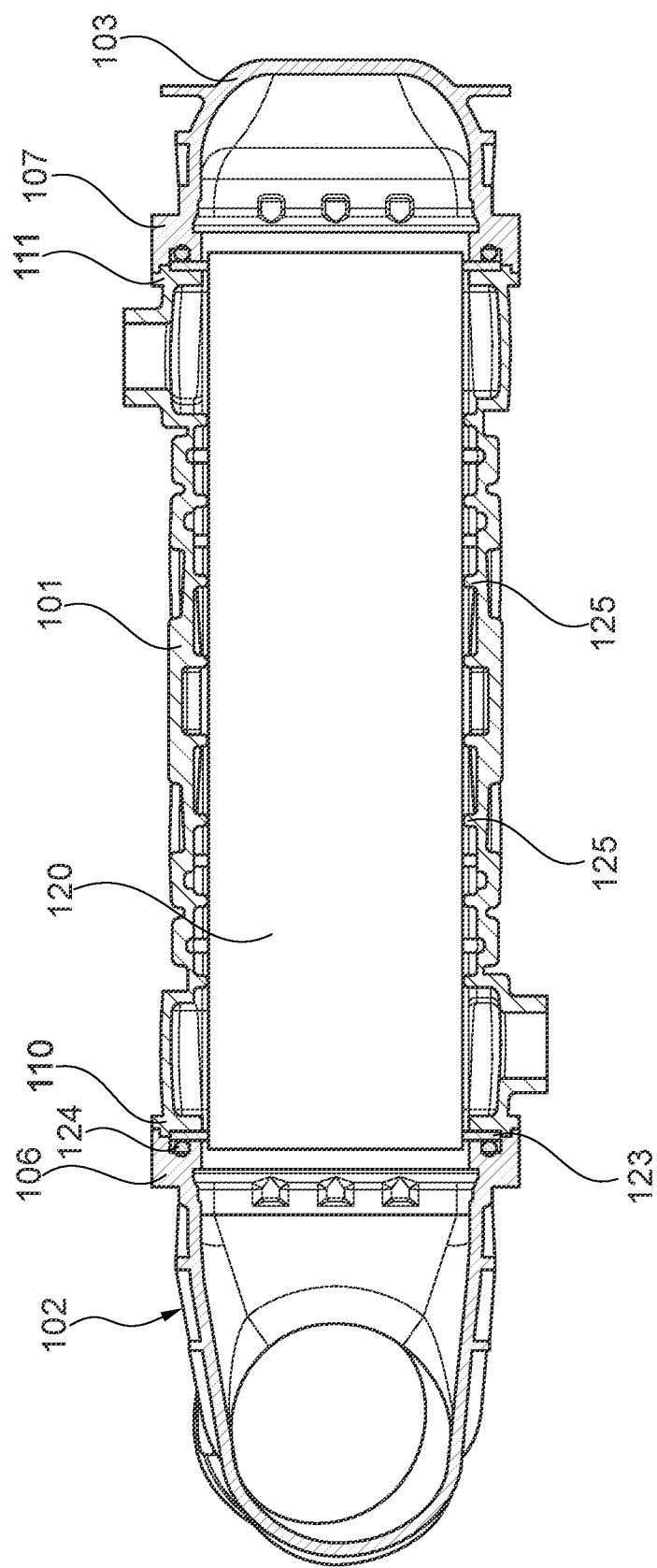
FIG. 13 shows a section through the heat exchanger of FIG. 11 according to line B-B.

FIG. 13 shows the heat exchanger unit in a section according to the line B-B of FIG. 11. It is seen how a tube 120 is accommodated in the housing 101. The respective flange 110, 111 projects outwardly beyond the tubesheet 123, wherein the flange 106, 107 of the additional housing sections 102, 103 accommodates the seal 124 and presses it against the respective tubesheet and so has a sealing effect between the region of the coolant which flows around the tubes 120 and the region of the medium which flows through the tubes 120. Also to be seen in the region of the housing 101 are the ribs 125 which project radially inward and are advantageously supported on the tube or on the tubes in the edge region. The effect of this is that the coolant is deflected by the ribs 125 in such a way that an improved flow around the tubes, and therefore also an improved exchange of heat, are achieved.

Figure 14:
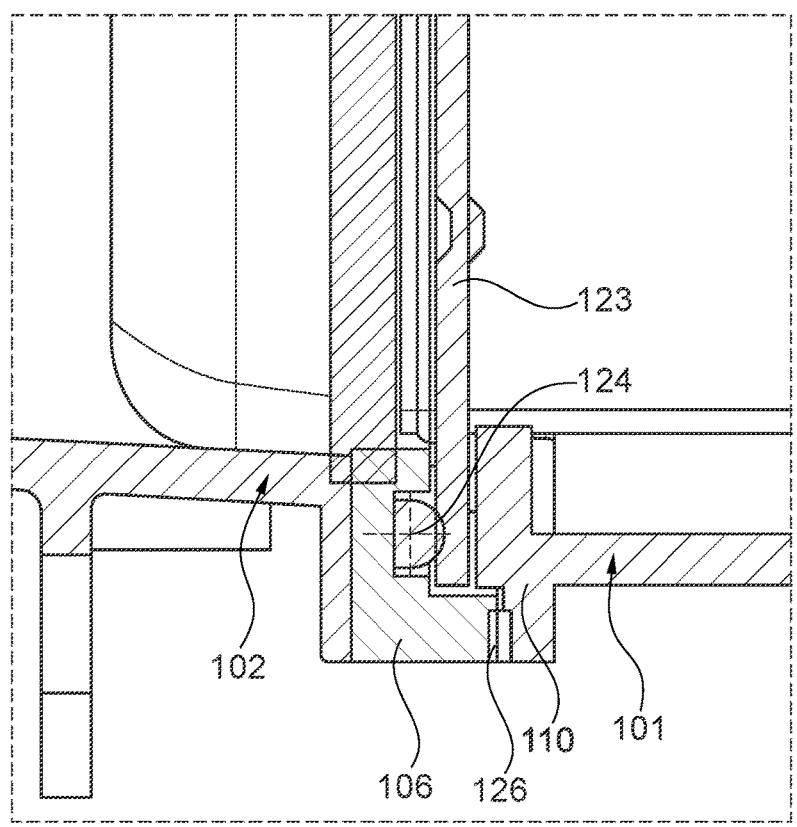
FIG. 14 shows a detail of FIG. 13 enlarged.

FIG. 14 once again shows the region of the tubesheet-to-flange connection of FIG. 13 in an enlarged detail. The detail shows the housing 101 with the flange 110, wherein the housing section 102 with its flange 106 is arranged in such a way that the two flanges 106 and 110 make contact with the outer region 126 and are connected and sealed there by means of adhesive bonding or welding, for example. Furthermore, the tubesheet 123 projects between the flange 110 and the flange 106, wherein the seal 124 is accommodated between the flange 106 and the tubesheet 123. To this end, the flange 106 has a recess which is of rectangular design, wherein the seal is accommodated in the region of the recess.

Figure 15:
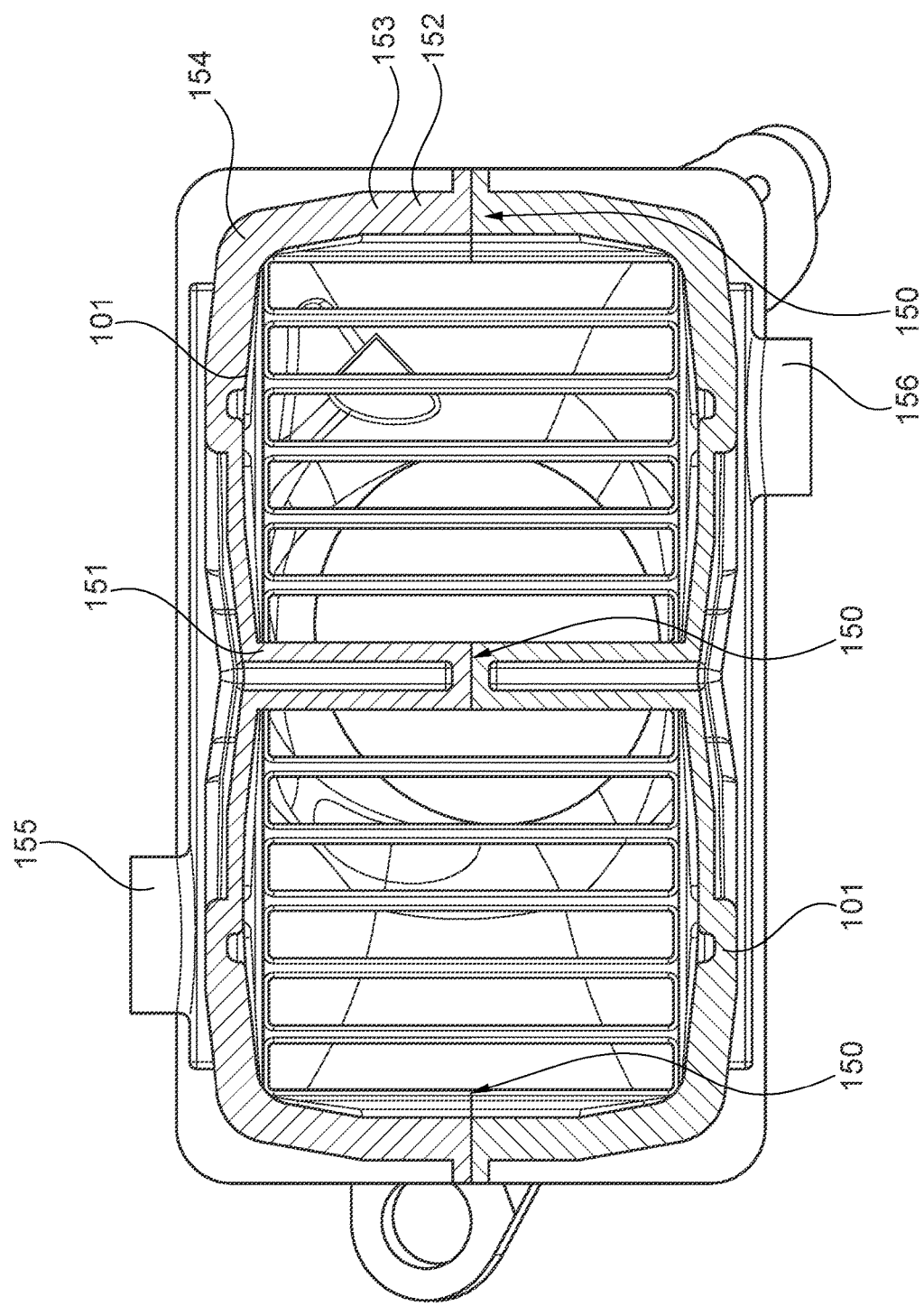
FIG. 15 shows a section through the heat exchanger of FIG. 11 according to line C-C.

FIG. 15 shows a section of the heat exchanger according to the connection line C-C of FIG. 11. To be seen in this case is that the two housing elements 101 abut by their contact face 150 and are interconnected there.

The housing is divided in a center region by means of the central partition 151, wherein the central partition is formed by the rectangular projections 34 according to FIG. 7 and form a tie rod. The shape of the housing 101 is not strictly rectangular but has a curved region 152 in each case which is formed by a straight central region and a curved corner region 154. This brings about an improved pressure stability of the housing.

Also to be seen are connectors 155 and 156 which are arranged on opposite side walls of the housing.

Figure 16:
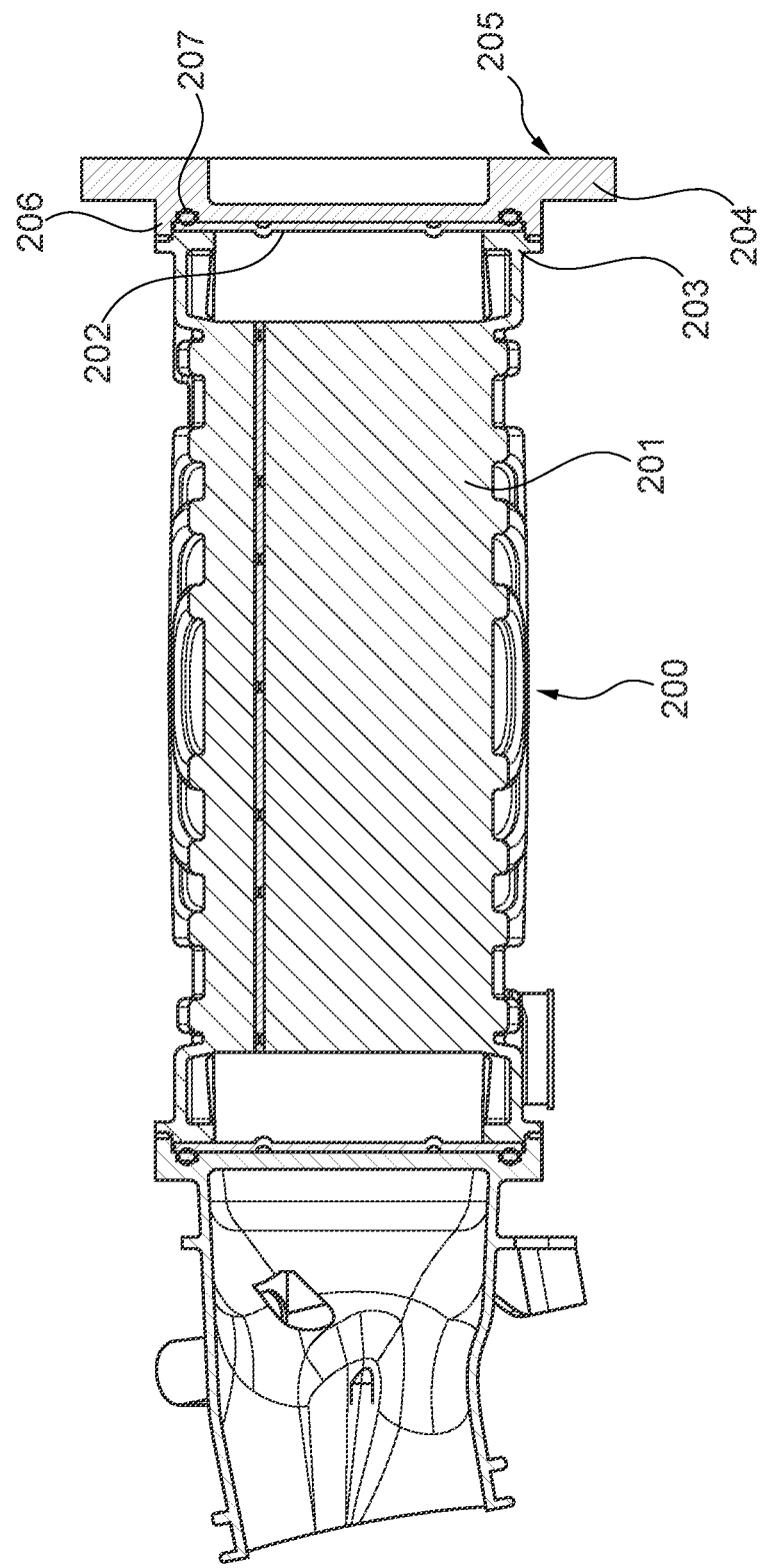
FIG. 16 shows a section through an alternative design of a neat exchanger.

FIG. 16 snows a further exemplary embodiment of the invention, in which the heat exchanger 200 is equipped with the housing 201. The housing 201 has a flange 203 which is arranged adjacent to the tubesheet 202. As a further housing section 205, provision is made for a type of flange plate which has a flange 204, especially for fastening on a further component in the course of the fluid path. Ay means of the flange plate, a flange 206 is in contact with the flange 203 of the housing, wherein the two flanges are interconnected and sealed there. In this case, the tubesheet 202 is arranged between the flange 203 and the flange 206 and sealed by means of the seal 207.

The invention claimed is:

1. A heat exchanger comprising
a tube-to-tubesheet sub-assembly, in which tubes are sealed at their ends into openings of two oppositely-disposed tubesheets, wherein at least one region of a housing is arranged between the two tubesheets and encompasses and outwardly seals the tubes of the sub-assembly against the environment, wherein the two tubesheets have two sides extending parallel to each other and adjoining an end region of the tubes in each case, and on which is arranged in each case a housing section which is connected to the housing, wherein on at least one of the tubesheets a seal is arranged with scaling effect between the housing and this tubesheet and/or between this tubesheet and the housing section which is arranged on this tubesheet,
wherein the housing between the two tubesheets consists of at least two elements which are interconnected in a fluidtight manner, wherein each element comprises a base, two side walls, and a projection, wherein each projection is arranged on the base and projects orthogonally from the base into a space spanning between the bases of the at least two elements and bounded by two tubes in the tube-to-tubesheet sub-assembly, wherein end regions of each of the projections abut and engage one another, wherein the bases of the at least two elements are substantially parallel to one another,
wherein there is an opening between the tubes of the sub-assembly for penetration of at least one projection element which interconnects, or interconnect, at least two housing elements.

2. The heat exchanger as claimed in claim 1, wherein the housing consists of two shells which in each case at least partially enclose the sub-assembly and which are interconnected in a fluidtight manner.

3. The heat exchanger as claimed in claim 1, wherein at least two elements of the housing consist of metal or plastic and are interconnected welding, adhesive bonding, or soldering.

4. The heat exchanger as claimed in claim 1, wherein the housing section consists of metal or plastic and are connected to the housing by means of welding, or adhesive bonding, or soldering.

5. The heat exchanger as claimed in claim 1, wherein the housing, on at least one lateral end in relation to one of the two tubesheets, has a flange which projects laterally beyond said tubesheet, wherein the housing section, on its one lateral end, also has a flange which projects laterally beyond said tubesheet, wherein the housing and the housing section in the region of the projecting flanges are interconnected in a sealed manner in such a way that said tubesheet is accommodated by the housing and the housing section.

6. The heat exchanger as claimed in claim 5, wherein at each tubesheet a seal is arranged between the flange of the housing and the tubesheet for sealing the interior of the housing in relation to the interior of the housing section.

7. The heat exchanger as claimed in claim 5, wherein at each tubesheet a seal is arranged between the flange of an additional housing section and the tubesheet for sealing the interior of the housing in relation to the interior of the additional housing section.

8. The heat exchanger as claimed in claim 5, wherein at each tubesheet two seals are arranged on both sides of the tubesheet.

9. The heat exchanger as claimed in claim 1,
wherein each housing element comprises two opposite side walls joined by a base region, wherein on the base region are arranged a plurality of ribs formed perpendicularly to the flow direction of a fluid in the tubes of the tube-to-tubesheet sub-assembly.

10. A heat exchanger comprising
a tube-to-tubesheet sub-assembly, in which tubes are sealed at their ends into openings of two oppositely-disposed tubesheets, wherein at least one region of a housing is arranged between the two tubesheets and encompasses and outwardly seals the tubes of the sub-assembly against the environment, wherein the two tubesheets have two sides extending parallel to each other and adjoining an end region of the tubes in each case, and on which is arranged in each case a housing section which is connected to the housing, wherein on at least one of the tubesheets a seal is arranged with sealing effect between the housing and this tubesheet and/or between this tubesheet and the housing section which is arranged on this tubesheet, wherein the housing between the two tubesheets consists of at least two elements which are interconnected in a fluidtight manner, wherein each element comprises a base, two side walls, and a projection, wherein each projection is arranged on the base and projects orthogonally from the base into a space spanning between the bases of the at least two elements and bounded by two tubes in the tube-to-tubesheet sub-assembly, wherein end regions of each of the projections abut and engage one another, wherein the bases of the at least two elements are substantially parallel to one another, wherein each housing element comprises two opposite side walls joined by a base region, wherein on the base region are arranged a plurality of ribs formed perpendicularly to the flow direction of a fluid in the tubes of the tube-to-tubesheet sub-assembly, wherein the housing, on at least one lateral end in relation to one of the two tubesheets, has a flange which projects laterally beyond said tubesheet, wherein the housing section, on its one lateral end, also has a flange which projects laterally beyond said tubesheet, wherein the housing and the housing section in the region of the projecting flanges are interconnected in a sealed manner in such a way that said tubesheet is accommodated by the housing and the housing section, wherein there is an opening between the tubes of the sub-assembly for penetration of at least one projection which interconnects, or interconnect, at least two housing elements.

\* \* \* \* \*